United States Patent
Yang et al.

(10) Patent No.: US 10,732,306 B2
(45) Date of Patent: Aug. 4, 2020

(54) SLOW NEUTRON DETECTION DEVICE

(71) Applicants: Nuctech Company Limited, Beijing (CN); Tsinghua University, Beijing (CN)

(72) Inventors: Yigang Yang, Beijing (CN); Yuanjing Li, Beijing (CN); Zhujun Fang, Beijing (CN); Yulan Li, Beijing (CN)

(73) Assignees: Nuctech Company Limited, Beijing (CN); Tsingchua University, Beijing (CN)

( * ) Notice: Subject to any disclaimer, the term of this patent is extended or adjusted under 35 U.S.C. 154(b) by 247 days.

(21) Appl. No.: 15/700,380

(22) Filed: Sep. 11, 2017

(65) Prior Publication Data

US 2018/0074217 A1 Mar. 15, 2018

(30) Foreign Application Priority Data

Sep. 13, 2016 (CN) .......................... 2016 1 0821372

(51) Int. Cl.
*G01T 3/00* (2006.01)
*G01T 1/167* (2006.01)
*H01J 47/12* (2006.01)

(52) U.S. Cl.
CPC .............. *G01T 3/008* (2013.01); *G01T 1/167* (2013.01); *H01J 47/12* (2013.01)

(58) Field of Classification Search
CPC ........... G01T 3/008; G01T 1/167; H01J 47/12
USPC ............... 376/153, 154, 155; 250/71.5, 83.1, 250/357.1, 390.01
See application file for complete search history.

(56) References Cited

U.S. PATENT DOCUMENTS

| | | | |
|---|---|---|---|
| 4,320,299 A | 3/1982 | Bateman | |
| 8,975,593 B1 | 3/2015 | Best et al. | |
| 2007/0210790 A1* | 9/2007 | Butters | G01N 37/005 324/248 |

(Continued)

FOREIGN PATENT DOCUMENTS

| | | |
|---|---|---|
| CN | 102313898 A | 1/2012 |
| CN | 102565846 B | 7/2012 |

(Continued)

OTHER PUBLICATIONS

Sauli, "Recent developments and applications of fast position-sensitive gas detectors", Nuclear Instruments and Methods in Physics Research Section A: Accelerators, Spectrometers, Detectors and Associated Equipment, 422, No. 1-3 (1999): 257-262. (Year: 1999).*

(Continued)

*Primary Examiner* — Jack W Keith
*Assistant Examiner* — Daniel Wasil
(74) *Attorney, Agent, or Firm* — Schwegman Lundberg & Woessner, P.A.

(57) ABSTRACT

A slow neutron detection device is disclosed, comprising: a first slow neutron converter and a second slow neutron converter, and a readout electrode wire set and cathode wire sets arranged between the first slow neutron converter and the second slow neutron converter. By arranging a readout circuit between the two slow neutron converters, an electron drift distance is reduced by half without changing a dimension of the detection device, and an average over-threshold probability of a signal is increased.

8 Claims, 4 Drawing Sheets

(56) References Cited

U.S. PATENT DOCUMENTS

| | | | |
|---|---|---|---|
| 2008/0272307 A1* | 11/2008 | Helsby | G01T 1/185 250/389 |
| 2010/0314549 A1 | 12/2010 | Wang et al. | |
| 2011/0025853 A1 | 2/2011 | Richardson | |
| 2011/0133097 A1 | 6/2011 | Zhong et al. | |
| 2012/0217406 A1* | 8/2012 | McGregor | G01T 3/008 250/382 |
| 2013/0067741 A1 | 3/2013 | Stephan et al. | |
| 2014/0061490 A1* | 3/2014 | Zhao | G01T 3/008 250/390.01 |
| 2014/0077088 A1 | 3/2014 | Feller et al. | |
| 2017/0184735 A1* | 6/2017 | Yang | G01T 3/008 |

FOREIGN PATENT DOCUMENTS

| | | | |
|---|---|---|---|
| CN | 104101895 A | | 10/2014 |
| CN | 104111471 A | * | 10/2014 |
| CN | 104111471 A | | 10/2014 |
| CN | 105445779 A | | 3/2016 |
| CN | 205450297 U | | 8/2016 |
| CN | 206057590 U | | 3/2017 |
| EP | 0237327 A2 | | 9/1987 |
| JP | H05134049 A | | 5/1993 |
| RU | 2102775 C1 | * | 1/1998 |
| RU | 2102775 C1 | | 1/1998 |
| RU | 2565829 C1 | | 10/2015 |
| WO | WO-2005036131 A2 | | 4/2005 |
| WO | WO-2011025853 A1 | | 3/2011 |

OTHER PUBLICATIONS

"Russian Application Serial No. 2017131586/28 Office Action dated May 22, 2018", w/ English Translation, (May 22, 2018), 9 pgs.

"Chinese Application Serial No. 201610821372.X Office Action dated Apr. 28, 2018", 8 pgs.

"European Application Serial No. 17190566.4, Extended European Search Report dated Feb. 6, 2018", (Feb. 6, 2018), 11 pgs.

Fang, Zhujun, et al., "The research of high detection efficiency boron lined detector with a honeycomb neutron converter", Nuclear Science Symposium and Medical Imaging Conference (NSS/MIC), (Oct. 31, 2015), 1-4.

"European Application Serial No. 17 190 566.4 Office Action dated Jul. 16, 2019", 11 pgs.

Köhli, M., et al., "CASCADE—a multi-layer Boron-10 neutron detection system", Journal of Physics: Conference Series. vol. 746. No. 1. IOP Publishing, (Feb. 12, 2016), 8 pgs.

Köhli, M., et al., "Efficiency and spatial resolution of the CASCADE thermal neutron detector", Nuclear Instruments and Methods in Physics Research Section A: Accelerators, Spectrometers, Detectors and Associated Equipment 828, (May 14, 2016), 242-249.

"European Application Serial No. 17 190 566.4, Office Action dated Dec. 11, 2019", (Dec. 11, 2019), 8 pgs.

* cited by examiner

SLOW NEUTRON DETECTION DEVICE

CLAIM FOR PRIORITY

This application claim the benefit of priority of Chinese Application No. 201610821372.X, filed Sep. 13, 2016, which is hereby incorporated by reference in its entirety.

TECHNICAL FIELD

The present disclosure relates to slow neutron detection, and more particularly, to a slow neutron detection device for improving efficiency of slow neutron detection.

BACKGROUND

With gradually increasing applications of slow neutron detection and imaging technology in homeland security, material monitoring, slow neutron scattering source measurement and the like, requirements on slow neutron detectors are gradually increased. However, widely used $^3$He gas is unable to meet a growing demand for use. Different types of new slow neutron detectors have been developed for replacement of the $^3$He, including a gas slow neutron detector, a scintillator slow neutron detector, a semiconductor slow neutron detector, and so on.

For a slow neutron detector, a slow neutron converter is one of important structures. There is no charge in a slow neutron itself, and except for a few slow neutron sensitive nuclides such as $^6$Li, $^{10}$B, Gd, the slow neutron and other substances have relatively small reaction cross-sections, an intuitive effect is thus that the slow neutron is difficult to be directly detected. The slow neutron converter has plenty of slow neutron sensitive nuclides therein, and slow neutrons can be converted into charged particles by nuclear reactions. The detector may measure energy and position information of these charged particles more conveniently, and may in turn obtain relevant physical information of the incident slow neutrons.

In design of the gas slow neutron detector, there may be various types of slow neutron converters and slow neutron detectors, such as a gas slow neutron detector based on a cylindrical proportional detector array, a gas slow neutron detector based on plane-parallel ionization chamber stacking, depending on different basic detectors being used.

In the gas slow neutron detector based on the cylindrical proportional detector array, the most basic slow neutron detection unit is a cylindrical proportional detector, and each unit has an independent anode wire and a signal collection and processing system, typically, e.g., an array of "straw-tube" slow neutron detectors. However, a slow neutron sensitive area of the detector and slow neutron detection efficiency are roughly proportional to a square of the number of the cylindrical proportional detectors. There will be a great amount of work in installation and maintenance of a large number of anode wires in the whole system, and difference in detection efficiencies of various slow neutron detection units also adversely affects overall performance of the system.

In the gas slow neutron detector based on plane-parallel ionization chamber stacking, the most basic slow neutron detection unit is a plane-parallel ionization chamber, and each ionization chamber has an independent two-dimensional signal readout system, typically, e.g., a Gd-GEM slow neutron detector. However, the slow neutron detection efficiency of a single layer of plane-parallel ionization chamber is relatively low, and certain methods, such as multi-stacking or slow neutron grazing-incidence, are required to improve the overall efficiency of slow neutron detection. However, it will bring a great pressure on the overall signal readout processing, and is inconvenient to achieve slow neutron detection in a large area.

SUMMARY

In view of one or more of problems in the prior art, a slow neutron detection device is provided.

According to an aspect of the present disclosure, a slow neutron detection device is provided, comprising: a first slow neutron converter and a second slow neutron converter configured to react with incident neutrons and generate electrons; and an electron multiplication and readout apparatus arranged between the first slow neutron converter and the second slow neutron converter, and configured to multiple the electrons and reading out the electrons.

According to some embodiments, the electron multiplication and readout apparatus comprises: a first cathode wire set including a plurality of electrode wires disposed in parallel, and arranged between the first slow neutron converter and the second slow neutron converter and near an end of the first slow neutron converter; a second cathode wire set including a plurality of electrode wires disposed in parallel, and arranged between the first slow neutron converter and the second slow neutron converter and near an end of the second slow neutron converter; and a readout electrode wire set including a plurality of electrode wires disposed in parallel, working as an anode, and arranged between the first cathode wire set and the second cathode wire set, the plurality of electrode wires of the readout electrode wire set being substantially perpendicular to a direction along which the plurality of electrode wires of the first cathode wire set extends and a direction along which the plurality of electrode wires of the second electrode wire set extends.

According to some embodiments, the slow neutron detection device further comprises: a first cathode plate arranged at the other end of the first slow neutron converter relative to the first cathode wire set; and a second cathode plate arranged at the other end of the second slow neutron converter relative to the second cathode wire set.

According to some embodiments, the slow neutron detection device further comprises: a first electric field protection wire set including a plurality of electrode wires disposed in parallel, and arranged between the first cathode wire set and the first slow neutron converter; and a second electric field protection wire set including a plurality of electrode wires disposed in parallel, and arranged between the second cathode wire set and the second neutron converter.

According to some embodiments, a separation distance between the readout electrode wire set and each of the first cathode wire set is 2-3 mm, a separation distance between the readout wire set and the second cathode wire set is 2-3 mm, and a separation distance between the plurality of electrode wires of the readout electrode is 3-5 mm.

According to some embodiments, each of the first slow neutron converter and the second slow neutron converter comprises: a substrate including a plurality of through holes extending in a direction perpendicular to a plane where the plurality of electrode wires of the readout electrode is located and insulating walls between the plurality of through holes; and a boron layer covering at least an exposed surface of the plurality of through holes.

According to some embodiments, a volume of each of the first slow neutron converter and the second slow neutron converter is in a range of 1 to 20000 cm³, and a diameter of the through hole is in a range of 1 to 10 mm.

According to some embodiments, each of the first slow neutron converter and the second slow neutron converter is a cuboid Boron-coated slow neutron converter with a bottom area of 10 cm×10 cm and a height of 5 cm, and the diameter of the through hole is 3.6 mm.

According to some embodiments, the boron layer has a coating thickness of 1 to 3 μm, preferably 1.6 μm.

According to some embodiments, the slow neutron detection device further comprises a field cage with a cylindrical structure, wherein the field cage surrounds the first slow neutron converter and the second slow neutron converter.

According to some embodiments, the field cage comprises a plurality of coaxial copper rings for applying respective gradient voltages.

By arranging a readout circuit between the two slow neutron converters, an electron drift distance is reduced by half without changing a dimension of the detector, and an average over-threshold probability of a signal is increased.

BRIEF DESCRIPTION OF THE DRAWINGS

In order to better understand the present disclosure, embodiments of the present disclosure will be described according to the accompanying drawings, in which.

Not all of Circuits and Structures of the Embodiments are Shown in the drawings. Throughout the drawings, same reference numerals refer to same or similar components or features.

DETAILED DESCRIPTION

Hereinafter, particular embodiments of the present disclosure will be described in detail, and it should be noted that the embodiments described herein are for illustrative purposes only but not intended to limit the present disclosure. In the following description, numerous specific details are set forth in order to provide a thorough understanding of the present disclosure. It will be apparent, however, to the skilled in the art that the present disclosure needs not to be implemented with these specific details. In other instances, well-known circuits, materials, or methods are not specifically described in order to avoid obscuring the present disclosure.

Throughout the specification, reference to "an embodiment", "embodiment", "an example" or "example" means that a particular feature, structure, or characteristic described in connection with the embodiment or example is included in at least one embodiment of the present disclosure. Therefore, the phrase "in one embodiment", "in an embodiment", "an example" or "example" throughout the specification does not necessarily refer to the same embodiment or example. In addition, specific features, structures, or characteristics may be combined in one or more embodiments or examples in any suitable combination and/or sub-combination. In addition, it will be understood by the skilled in the art that the drawings provided herein are for the purpose of illustration and that the drawings are not necessarily drawn in scale. The term "and/or" used herein includes any and all combinations of one or more of the items as listed.

The term "slow neutron" mentioned below refers to neutrons below a certain value. A choice of such a value depends on specific application scenarios. For example, in neutron physics and nuclear technology applications, neutrons with energy less than 1 keV are usually referred to as slow neutrons.

For the problems of the slow neutron detection devices in the prior art, the embodiments of the present disclosure provide a slow neutron detection device for improving over-threshold probability of a signal. According to the embodiments of the present disclosure, the slow neutron detection device comprises two slow neutron converters, and a readout electrode wire set and cathode wire sets arranged between the two slow neutron converters. By arranging a readout circuit, such as a readout electrode wire set, between the two slow neutron converters, an electron drift distance is reduced by half without changing a dimension of the detection device, and an average over-threshold probability of the signal is increased.

Figure 1:
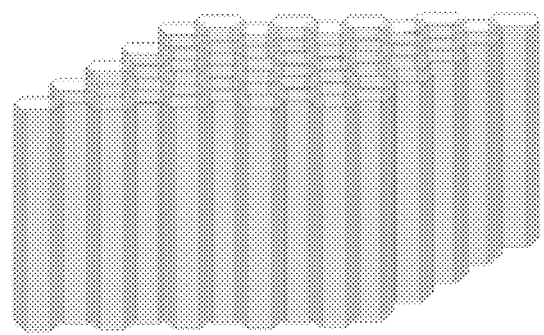
FIG. 1 shows a perspective view of a slow neutron converter according to an exemplary embodiment of the present disclosure.
Figure 2:
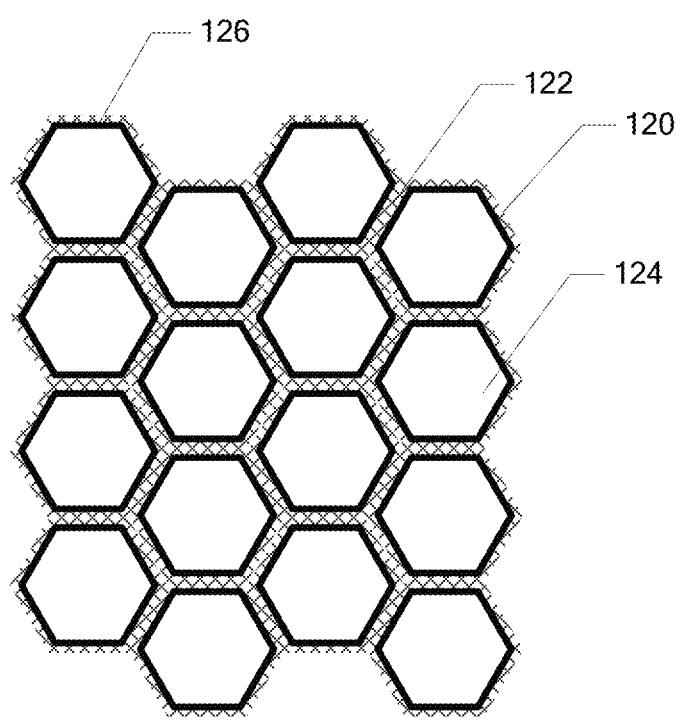
FIG. 2 shows a cross-sectional view of the slow neutron converter as shown in FIG. 1.

FIG. 1 shows a perspective view of a slow neutron converter according to an exemplary embodiment of the present disclosure. FIG. 2 shows a cross-sectional view of the slow neutron converter as shown in FIG. 1. It should be understood that the structure schematically shown in FIGS. 1 and 2 is only an example of the slow neutron converter according to the present disclosure, and the present disclosure is not limited to this.

As shown in FIGS. 1 and 2, the slow neutron converter 100 according to the present disclosure may comprise a substrate 120. The substrate 120 may comprise a plurality of holes 124 extending through the substrate in a first direction and insulating walls 122 arranged between the plurality of holes.

Each hole 124 may have a circular or polygonal cross-section. According to some embodiments, each hole has a regular polygonal cross-section. According to other embodiments, each hole has a regular hexagonal cross-section, and the plurality of holes are evenly arranged so that the slow neutron converter has a honeycomb structure as shown in FIGS. 1 and 2, but the present disclosure is not limited to this. The hole 124 may be filled with ionization working gas, as will be described in detail later.

As shown in FIG. 2, the slow neutron converter 100 may further comprise a boron layer 126 that covers at least an exposed surface of the plurality of holes 124. According to some embodiments, the boron layer 126 may be formed by dip coating or other suitable approaches.

The hole 124 may have a smooth exposed surface, so that the boron layer covering the substrate 120 has better uniformity and surface roughness (e.g., a flatness less than 0.1 μm).

According to the present disclosure, $^{nat}B$ (natural Boron) or $^{10}B$ (purified Boron) may be used as slow neutron conversion material.

According to some embodiments, the shape of substrate 120 may be a cube or a cuboid, but the present disclosure is not limited to this.

According to some embodiments, the insulating wall 122 may have a thickness in a range of 1 µm to 50 µm. For example, the insulating wall may have a thickness in a range of 5 µm to 20 µm. According to some embodiments, the insulating wall 122 comprises aramid paper.

Figure 3:
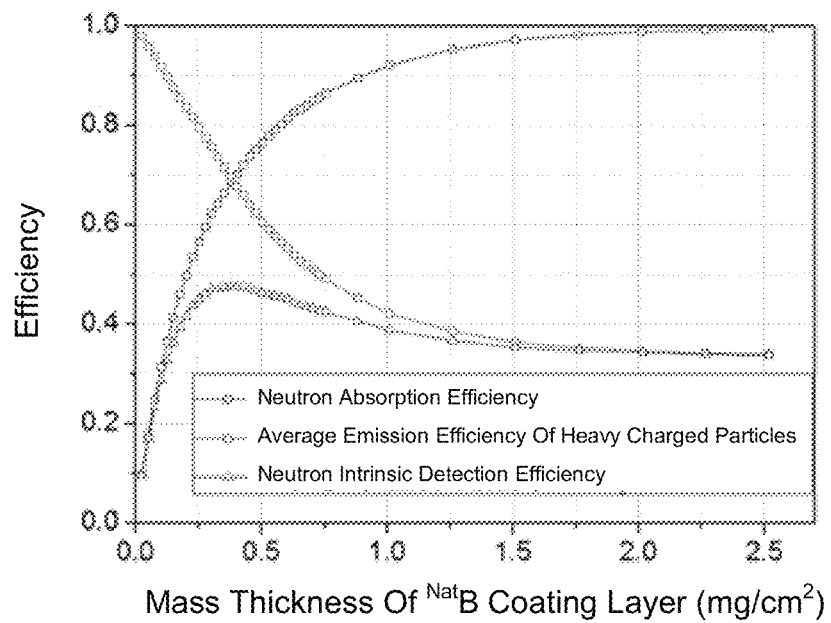
FIG. 3 shows a relationship between a slow neutron detection efficiency and a boron layer mass thickness of a slow neutron converter according to the present disclosure.

FIG. 3 is a graph showing a relationship between slow neutron detection efficiency and mass thickness of a boron layer of a slow neutron converter according to the present disclosure.

As shown in FIG. 3, If $^{nat}B$ is used as the slow neutron conversion material, and the mass thickness of the boron layer is maintained in a range of 0.232-0.694 mg/cm² (a corresponding thickness being 1 to 3 µm, preferably 1.6 µm at a density of 2.35 g/cm³), high slow neutron detection efficiency may be achieved.

According to some embodiments, the mass thickness of the boron layer may be 0.232-0.694 mg/cm². According to some other embodiments, the mass thickness of the boron layer may be 0.3-0.4 mg/cm². According to yet some other embodiments, the mass thickness of the boron layer may be 0.37 mg/cm².

The inventors have found that the boron layer being too thin may lead to a decrease in a probability of reacting with the slow neutrons, while the boron layer being too thick will cause heavy charged particles generated by the reaction to be difficult to enter into the honeycomb holes from the coating of the converter, both of which will significantly reduce the overall performance of slow neutron detection.

In addition, an aperture of the slow neutron converter may be selected according to different application scenarios. According to some embodiments, the hole 124 may have an inscribed circle diameter in a range of 0.1 mm to 20 mm. According to some other embodiments, the hole may have an inscribed circle diameter in a range of 3 mm to 10 mm. The inscribed circle, when used in this application, refers to a circle that may be tangent to the most sides of the hole.

In addition, a height of the slow neutron converter may be selected according to different application scenarios, in order to take both the higher slow neutron detection efficiency and the better electronic derivation effect into account. According to some embodiments, the substrate 120 may have a height in a range of 1 cm to 30 cm. For example, the substrate 120 may have a height in a range of 4 cm to 6 cm.

According to some embodiments, a volume of each of the two slow neutron converters is in a range of 1 to 20000 cm³, and a diameter of the hole 124 is in a range of 1 to 10 mm. In addition, it is preferred that the slow neutron converter may be a cuboid Boron-coated slow neutron converter with a bottom area of 10 cm×10 cm and a height of 5 cm, and the diameter of the through hole 124 is 3.6 mm.

According to some embodiments, the honeycomb structure may be formed by uniformly depositing nano-sized Boron powder on the substrate made of the aramid paper, and then it may be made, by cutting and tailoring, into the slow neutron converter whose aperture, length and thickness of the boron layer satisfy demands for the application scenarios.

Figure 4:
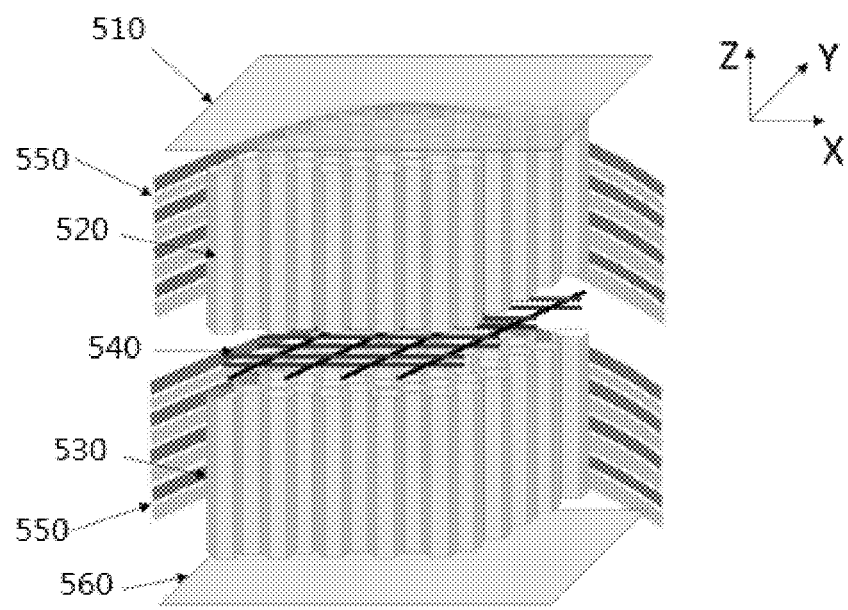
FIG. 4 shows a block diagram of a slow neutron detection device according to an exemplary embodiment of the present disclosure.

FIG. 4 shows a block diagram of a slow neutron detection device according to an exemplary embodiment of the present disclosure.

As shown in FIG. 4, the slow neutron detection device may comprise a first slow neutron converter 520, a second slow neutron converter 530, and electric field protection wire sets and cathode and anode signal wire sets 540. The first slow neutron converter 520 and the second slow neutron converter 530 may be the slow neutron converters as previously described in connection with FIGS. 1, 2 and 3. The slow neutron detection device may further comprise an upper cathode plate 510 arranged near one end of the first slow neutron converter 520 (upper end of the first slow neutron converter 520 in FIG. 4) and a lower cathode plate 560 arranged near one end of the second slow neutron converter 530 (lower end of the second slow neutron converter 530 in FIG. 4). An electric field is formed by the cathode plate 510 and an anode wire set of the electric field protection wire sets and the cathode and anode signal wire sets 540 to drive the electrons to drift towards the anode wire set. Similarly, an electric field is formed by the cathode plate 560 and the anode wire set of the electric field protection wire sets and the cathode and anode signal wire sets 540 to drive the electrons to drift towards the anode wire set, as will be described in detail later.

As described previously, each of the first slow neutron converter 520 and the second slow neutron converter 530 may comprise the substrate 120 and the boron layer 126. The plurality of holes 124 of the substrate 120 are filled with the ionization working gas for generating the electrons. The working gas which has a smaller electronic transverse diffusion coefficient may be used, so that the transverse diffusion of the electrons in a drift derivation process is as small as possible. According to some embodiments, the ionization working gas may be a mixed gas of 95% argon and 5% carbon dioxide, but the present disclosure is not limited to this. Any suitable gas may be possible to be used as the working gas.

According to some embodiments, as shown in FIG. 4, the slow neutron detection device may further comprise a field cage 550 having a cylindrical structure. The field cage 550 surrounds the two slow neutron converters 520 and 530. The field cage 550 may comprise a plurality of coaxial copper rings for applying respective gradient voltages. The field cage 550 may function as an isolation shield, and may constrain equipotential surfaces of its internal gas environment to be parallel in most areas, i.e., to form an approximately uniform electric field.

In addition, according to some embodiments, the slow neutron detection device may further comprise a guard ring (not shown). The guard ring may be arranged on both ends of the field cage for providing potentials at both ends of the field cage, assisting to achieve the uniform electric field.

Figures 5, 6:
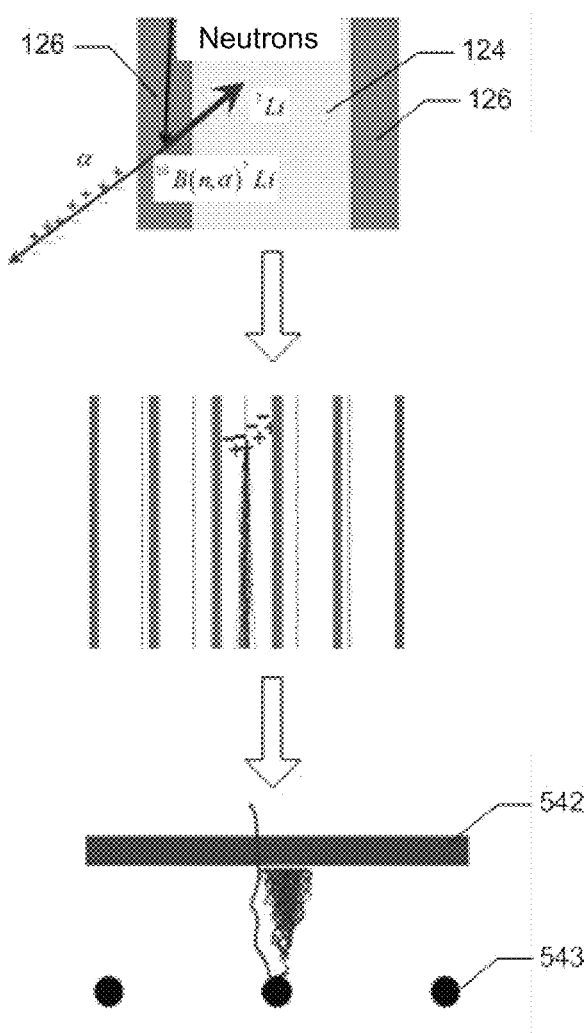
FIG. 5 shows a schematic diagram of a structure of a readout electrode wire set and cathode wire sets according to an exemplary embodiment of the present disclosure.
FIG. 6 shows a schematic diagram of an operation process of a slow neutron detection device according to the present disclosure.

FIG. 5 shows a schematic diagram of a structure of a readout electrode wire set and cathode wire sets according to an exemplary embodiment of the present disclosure. As shown in FIG. 5, in order to construct a drift electrode opposite to the cathode plate and through which the electrons can pass smoothly, some embodiments of the present disclosure use a set of metal wires to form the electric field protection wire sets 541 and 545, in order to isolate a drift electric field and a multiplication electric field without blocking movement of the electrons. As shown in FIG. 5, taking the fact that the electrons may arrive at a multiplication and readout apparatus 542, 543 and 544 from both an upper side and a lower side and convenience for use in the field of large area detection into account, the embodiments of the present disclosure use a technique of two-dimensional multi-wire electrodes to construct an electron multiplier, i.e., three sets of wires are used to construct a plane where the first and the second cathode wire sets 542 and 544 are located and a plane where the anode wire set 543 is located, both of the planes being arranged in parallel, wherein the electrode wires of the first and the second cathode wire sets 542 and 544 are perpendicular to the electrode wires of the anode wire set 543. Electron avalanche is achieved by utilizing a strong electric field near the anode wires. The electrons generated by the avalanche may be quickly collected by the anode wires, while the generated positive ions may drift by a distance and then collected by the first and the second cathode wire sets 542 and 554.

As shown in FIGS. 4 and 5, the first cathode wire set 542 comprises a plurality of electrode wires disposed in parallel and is arranged between the first slow neutron converter 520 and the second slow neutron converter 530 and near an end of the first slow neutron converter (lower end of the first slow neutron converter 520 in FIG. 4). The second cathode wire set 544 comprises a plurality of electrode wires disposed in parallel and is arranged between the first slow neutron converter 520 and the second slow neutron converter 530 and near an end of the second slow neutron converter (upper end of the second slow neutron converter 530 in FIG. 4). The readout electrode wire set 543 comprises a plurality of electrode wires disposed in parallel, working as an anode, and arranged between the first cathode wire set 542 and the second cathode wire set 544. The plurality of electrode wires of the readout electrode wire set 543 are substantially perpendicular to a direction along which the plurality of electrode wires of the first cathode wire set 542 extends and a direction along which the plurality of electrode wires of the second electrode wire set 543 extends. According to some embodiments, a separation distance between the readout electrode wire set 543 which is used as the anode wire set and each of the first cathode wire set 542 is 2-3 mm. A separation distance between the readout electrode wire and the second cathode wire set 543 is 2-3 mm, preferably 2 mm; and a separation distance between the wires of the anode wire set is 3-5 mm, preferably 4 mm.

As shown in FIG. 5, the slow neutron detection device may further comprise the first electric field protection wire set 541 and the second electric field protection wire set 545. The first electric field protection wire set 541 comprises a plurality of electrode wires disposed in parallel and arranged between the first cathode wire set 542 and the first slow neutron converter 520. The second electric field protection wire set 545 comprises a plurality of electrode wires disposed in parallel and arranged between the second cathode wire set 544 and the second neutron converter 545.

FIG. 6 shows a schematic diagram of an operation principle of a slow neutron detection device according to the present disclosure. The operation principle of the slow neutron detection device according to the present disclosure will be described below with reference to FIGS. 5 and 6.

As shown in FIG. 6, a slow neutron detection process according to the present disclosure may be divided into three parts: slow neutron absorption to electron formation, electron drift, and electron multiplication and signal collection.

A physical process of a slow neutron absorption to electron formation stage occurs inside the slow neutron converter. The incident slow neutrons undergo $^{10}B$ (n, $\alpha$) $^{7}Li$ reaction in the boron layer 126, resulting in heavy charged particles, $\alpha$ particles and $^{7}Li$, which have opposite movement directions and are evenly distributed in a 4$\pi$ solid angle. Therefore, each reaction at most has only one particle entering into the gas environment of the honeycomb hole 124. When the $\alpha$ particles or $^{7}Li$ move in the gas environment within the hole 124, energy may be deposited by the ionization effect to produce the electrons. If these electrons are detected by the detector, a corresponding electrical signal can be formed.

In this stage, the potential slow neutron detection efficiency of the entire detector may be determined depending on the probability of occurrence of the $^{10}B$ (n, $\alpha$) $^{7}Li$ reaction when the slow neutrons passing through the boron layer 126 and the average probability of the $\alpha$ particles and the $^{7}Li$ entering into the holes 124. As described above with reference to FIG. 3, when the mass thickness of the boron layer is maintained in the range of 0.232-0.694 mg/cm$^2$ (the corresponding thickness being 1 to 3 μm at the density of 2.35 g/cm$^3$), higher slow neutron detection efficiency may be achieved.

Due to the ionization effect of the heavy charged particles, initial positions where the electrons are generated are distributed inside the respective honeycomb holes of the entire slow neutron converter. In order for these electrons to form an output electrical signal, the scheme of the present disclosure enables the electrons drift from the holes. As previously stated, the electrons drift to one end of the slow neutron converter, i.e., drifting toward the electron multiplication and readout apparatus 542, 543, 544, under the drive of the electric field.

Considering that the electrons may arrive at the multiplication and readout apparatus 542, 543, 544 from both the upper and the lower sides and convenience for use in the field of large area detection, the embodiments of the present disclosure use a technique of two-dimensional multi-wire electrodes to construct an electron multiplier, i.e., using three sets of wires to construct a plane where the first and the second cathode wire sets 542 and 544 are located and a plane where the anode wire set 543 is located, both of the planes being arranged in parallel, wherein the electrode wires of the first and the second cathode wire sets 542 and 544 are perpendicular to the electrode wires of the anode wire set 543. Electron avalanche is achieved by the strong electric field near the anode wires. The electrons generated by the avalanche may be quickly collected by the anode wires, while the generated positive ions may drift by a distance, and then collected by the first and the second cathode wire sets 542 and 554.

The slow neutron detector of the above embodiments has two boron-coated thermal neutron converters 520 and 530, which share one electron avalanche and signal collection apparatus, and are arranged in a planar symmetry relationship. Such a design allows a maximum electron drift distance to be reduced by half in a case of a dimension of the detector being unchanged, which is very useful for improving the detection performance of the detector.

Figure 7:
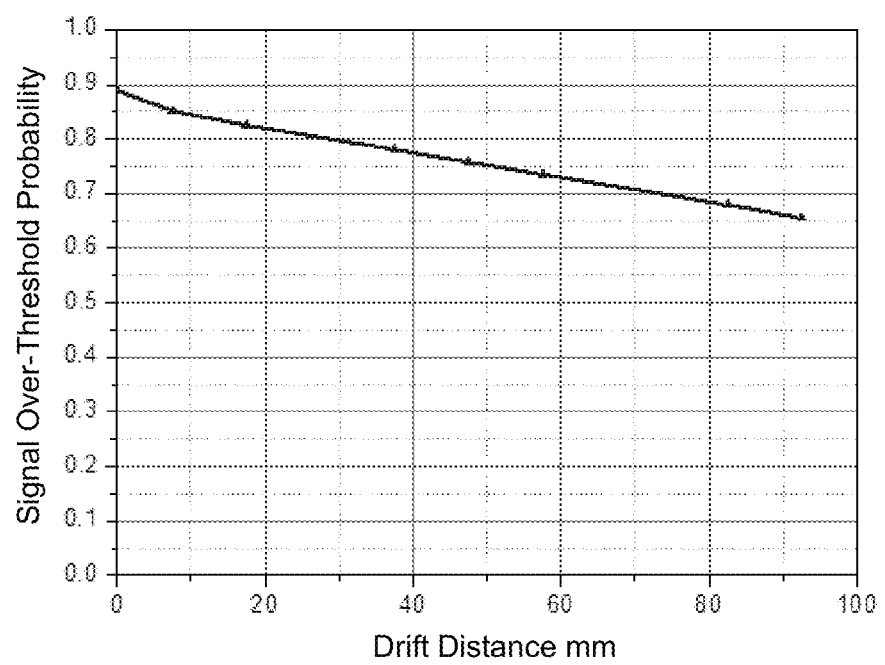
FIG. 7 shows a schematic diagram of increase in an over-threshold probability by a slow neutron detection device according to the present disclosure.

In order to remove electronic noise and a ray-γ signal, all of the gas neutron detectors need to set a certain threshold, and in a case that the threshold and the electron avalanche seem to be constant, the results of the electron drift will significantly affect the neutron detection efficiency. FIG. 7 shows a relationship between an electron drift distance and over-threshold probability of a signal when a threshold is given. As can be seen from FIG. 7, if a neutron converter with a height of 100 mm is split into two converters each with a height of 50 mm and a signal is read out therefrom, i.e., the maximum drift distance may be reduced to 50 mm from 100 mm, an average over-threshold probability of the signal may increase by 5%-10%.

A gas neutron detector with better performance may be produced with e.g. the boron-coated thermal neutron converter and the multi-wire readout design as described above. Compared to the detector designed with a single new boron-coated thermal neutron converter, the drift distance of the electrons in the thermal neutron converter is shortened without increasing the volume of the detector, which may improve the overall detection efficiency of the detector.

While the present disclosure has been described with reference to several typical embodiments, it should be understood that the terms used here are illustrative and exemplary but not restrictive. Since the present disclosure can be embodied in many forms without departing from the spirit or substance of the present disclosure, it should be understood that the above-described embodiments are not limited to any of the foregoing details, but should be construed broadly within the spirit and scope of the present disclosure as defined by the appended claims. Thus, all variations and modifications that fall within the scope of the claims or the equivalents thereof are intended to be covered by the appended claims.

We claim:

1. A slow neutron detection device, comprising:
a first slow neutron converter and a second slow neutron converter, filled with an ionization working gas for generating electrons and configured to generate the electrons in response to receiving incident slow neutrons having kinetic energy less than 100 electron volts; and
an electron multiplication and readout apparatus arranged between the first slow neutron converter and the second slow neutron converter and configured to multiply and read out the electrons received from the first slow neutron converter and the second slow neutron converter,
wherein the electron multiplication and readout apparatus comprises:
a first cathode wire set being arranged between the first slow neutron converter and the second slow neutron converter and near one end of the first slow neutron converter;
a second cathode wire set being arranged between the first slow neutron converter and the second slow neutron converter and near one end of the second slow neutron converter; and
a readout electrode wire set including a plurality of electrode wires disposed in parallel and working as an anode, the readout electrode wire set being arranged between the first cathode wire set and the second cathode wire set, the plurality of electrode wires of the readout electrode wire set being substantially perpendicular to a direction along which the plurality of electrode wires of the first cathode wire set extend and a direction along which the plurality of electrode wires of the second electrode wire set extend, the slow neutron device further comprising:
a first cathode plate arranged near the other end of the first slow neutron converter relative to the first cathode wire set; and
a second cathode plate arranged near the other end of the second slow neutron converter relative to the second cathode wire set, and
wherein each of the first cathode wire set, the second cathode wire set and the readout electrode wire set forms a plane substantially parallel to the first cathode plate and the second cathode plate.

2. The slow neutron detection device according to claim 1, further comprising:
a first electric field protection wire set including a plurality of electrode wires disposed in parallel, the first electric field protection wire set being arranged between the first cathode wire set and the first slow neutron converter; and
a second electric field protection wire set including a plurality of electrode wires disposed in parallel, the second electric field protection wire set being arranged between the second cathode wire set and the second slow neutron converter.

3. The slow neutron detection device according to claim 1, wherein a separation distance between the readout electrode wire set and each of the first cathode wire set is 2-3 mm, a separation distance between the readout electrode wire set and the second cathode wire set is 2-3 mm, and a separation distance between the plurality of electrode wires of the readout electrode is 3-5 mm.

4. The slow neutron detection device according to claim 1, wherein each of the first slow neutron converter and the second slow neutron converter comprises:
a substrate including a plurality of through holes and insulating walls between the plurality of through holes, the plurality of through holes extending in a direction perpendicular to a plane formed by the plurality of electrode wires of the readout electrode wire set; and
a boron layer covering at least an exposed surface of the plurality of through holes.

5. The slow neutron detection device according to claim 4, wherein a volume of each of the first slow neutron converter and the second slow neutron converter is in a range of 1 to 20000 $cm^3$, and a diameter of each of the plurality of through holes is in a range of 1 to 10 mm.

6. The slow neutron detection device according to claim 5, wherein each of the first slow neutron converter and the second slow neutron converter is a cuboid Boron-coated slow neutron converter with a bottom area of 10 cm×10 cm and a height of 5 cm.

7. The slow neutron detection device according to claim 6, wherein the boron layer has a coating thickness of 1 to 3 µm, preferably 1.6 µm.

8. The slow neutron detection device according to claim 1, further comprising a field cage with a cylindrical structure, wherein the field cage surrounds the first slow neutron converter and the second slow neutron converter and comprises a plurality of coaxial copper rings for applying respective gradient voltages.

* * * * *